United States Patent
Wu et al.

(10) Patent No.: US 12,197,223 B2
(45) Date of Patent: Jan. 14, 2025

(54) INTELLIGENT OBSTACLE AVOIDANCE METHOD AND APPARATUS BASED ON BINOCULAR VISION, AND NON-TRANSITORY COMPUTER-READABLE STORAGE MEDIUM

(71) Applicant: FJ Dynamics Co., Ltd., Shenzhen (CN)

(72) Inventors: Di Wu, Shenzhen (CN); Qichang Zhang, Shenzhen (CN); Wenquan Zhao, Shenzhen (CN); Wei Huang, Shenzhen (CN)

(73) Assignee: FJ Dynamics Co., Ltd., Shenzhen (CN)

( * ) Notice: Subject to any disclaimer, the term of this patent is extended or adjusted under 35 U.S.C. 154(b) by 229 days.

(21) Appl. No.: 17/939,214

(22) Filed: Sep. 7, 2022

(65) Prior Publication Data
US 2023/0367319 A1    Nov. 16, 2023

(30) Foreign Application Priority Data
May 10, 2022    (CN) .......................... 202210505473.1

(51) Int. Cl.
*G05D 1/00*    (2024.01)
(52) U.S. Cl.
CPC ......... *G05D 1/0214* (2013.01); *G05D 1/0094* (2013.01)

(58) Field of Classification Search
CPC .......................... G05D 1/0214; G05D 1/0094
See application file for complete search history.

(56) References Cited

U.S. PATENT DOCUMENTS

2021/0089040 A1*   3/2021   Ebrahimi Afrouzi ........................ A47L 9/2873

FOREIGN PATENT DOCUMENTS

| CN | 108229366 A | 6/2018 |
|---|---|---|
| CN | 112363513 A | 2/2021 |
| CN | 112528771 A | 3/2021 |

* cited by examiner

*Primary Examiner* — Michael D Lang
(74) *Attorney, Agent, or Firm* — ScienBiziP, P.C.

(57) ABSTRACT

Provided are an intelligent obstacle avoidance method and apparatus based on binocular vision, a robot and a medium. The method includes acquiring, through a binocular camera, a depth map of a work scene in a moving direction of a robot, and calculating a height map corresponding to the work scene according to the depth map; determining first obstacle information in the work scene according to the depth map and determining second obstacle information in the work scene according to the height map; determining a target obstacle existing in the work scene and position information of the target obstacle according to the first obstacle information and the second obstacle information; and controlling the robot to perform obstacle avoidance according to the position information and a preset path of the robot.

18 Claims, 2 Drawing Sheets

---

Acquire, through a binocular camera, a depth map of a work scene in a moving direction of a robot, and calculate a corresponding height map according to the depth map — S11

Determine first obstacle information in the work scene according to the depth map and determine second obstacle information in the work scene according to the height map — S12

Determine a target obstacle existing in the work scene and position information of the target obstacle according to the first obstacle information and the second obstacle information — S13

Control the robot to perform obstacle avoidance according to the position information and a preset path of the robot — S14

INTELLIGENT OBSTACLE AVOIDANCE METHOD AND APPARATUS BASED ON BINOCULAR VISION, AND NON-TRANSITORY COMPUTER-READABLE STORAGE MEDIUM

CROSS-REFERENCE TO RELATED APPLICATION

This application claims priority to Chinese Patent Application No. 202210505473.1 filed May 10, 2022, the disclosure of which is incorporated herein by reference in its entirety.

TECHNICAL FIELD

Embodiments of the present disclosure relate to the field of robot technology and, in particular, to an intelligent obstacle avoidance method and apparatus based on binocular vision, a robot and a medium.

BACKGROUND

In recent years, with the continuous development of science and technology and the needs of industrial transformation and upgrading, an increasing number of intelligent equipment has appeared in people's work and life, aiming to improve production efficiency and reduce labor costs. As a representative intelligent product, mobile robots are widely applied in homes and various production sites. For example, the environment of each pasture is different, and feeding trucks or some production vehicles are often parked in a cowshed of the pasture; therefore, obstacles in the working environment of a pusher robot in the pasture are constantly changed. To not affect the work of the pusher robot, it is necessary to recognize obstacles and perform corresponding obstacle avoidance.

At present, the common obstacle avoidance methods mainly include infrared obstacle avoidance, ultrasonic obstacle avoidance, laser obstacle avoidance and visual obstacle avoidance. For the infrared obstacle avoidance and ultrasonic barrier avoidance, light rays or sound waves need to be actively emitted, so there are requirements for reflective objects. For example, infrared rays can be absorbed by black objects. The binocular vision avoidance, although affected by light rays, is less disturbed in the cowshed and has good general applicability. Although the function of laser is similar to that of the binocular vision, the price of lidar is relatively high and the volume of lidar is large. Moreover, since the fever is easy to provoke some mosquitoes, the obstacle avoidance effect is affected.

However, the currently used binocular vision obstacle avoidance method may recognize some wrong obstacles, resulting in relatively low accuracy of obstacle recognition, thereby affecting the mobile robot to have some wrong obstacle avoidance processes.

SUMMARY

Embodiments of the present disclosure provide an intelligent obstacle avoidance method and apparatus based on binocular vision, a robot and a medium to improve the accuracy of obstacle recognition so that a robot can perform effective obstacle avoidance.

In a first aspect, an embodiment of the present disclosure provides an intelligent obstacle avoidance method based on binocular vision. The method includes the following steps: a depth map of a work scene in a moving direction of a robot is acquired through a binocular camera, and a height map corresponding to the work scene is calculated according to the depth map; first obstacle information in the work scene is determined according to the depth map and second obstacle information in the work scene is determined according to the height map; a target obstacle existing in the work scene and position information of the target obstacle are determined according to the first obstacle information and the second obstacle information; and the robot is controlled to perform obstacle avoidance according to the position information and a preset path of the robot.

In an embodiment, the step in which the target obstacle existing in the work scene and the position information of the target obstacle are determined according to the first obstacle information and the second obstacle information includes that a first initial obstacle existing in the depth map is determined according to the first obstacle information, and a second initial obstacle existing in the height map is determined according to the second obstacle information; the overlap region of the first initial obstacle and the second initial obstacle is identified, and the overlap ratio of the first initial obstacle and the second initial obstacle is calculated based on the overlap region; and the overlap ratio is compared with the preset overlap ratio threshold, and if the overlap ratio is greater than or equal to the preset overlap ratio threshold, the first initial obstacle or the second initial obstacle is determined as the target obstacle.

In an embodiment, the step in which the overlap region of the first initial obstacle and the second initial obstacle is identified, and the overlap ratio of the first initial obstacle and the second initial obstacle is calculated based on the overlap region includes that a first minimum circumscribed rectangle of the first initial obstacle and a second minimum circumscribed rectangle of the second initial obstacle are extracted; the overlap region is identified according to the first minimum circumscribed rectangle and the second minimum circumscribed rectangle; and the overlap ratio is calculated according to first coordinates of the first minimum circumscribed rectangle and second coordinates of the second minimum circumscribed rectangle.

In an embodiment, the step in which the target obstacle existing in the work scene and the position information of the target obstacle are determined according to the first obstacle information and the second obstacle information further includes that the position information is determined according to the first coordinates and/or the second coordinates corresponding to the target obstacle.

In an embodiment, after the step in which the first initial obstacle existing in the depth map is determined according to the first obstacle information, the method further includes the following step: first initial obstacles are screened according to first contour areas of the first initial obstacles to remove the first initial obstacle whose first contour area is smaller than a first preset area threshold; and after the step in which the second initial obstacle existing in the height map is determined according to the second obstacle information, the method further includes the following step: second initial obstacles are screened according to second contour areas of the second initial obstacles to remove the second initial obstacle whose second contour area is smaller than a second preset area threshold.

In an embodiment, the step in which the height map corresponding to the work scene is calculated according to the depth map includes that the depth map is converted to point cloud data of the work scene; and the point cloud data is converted to the height map.

In an embodiment, the step in which the first obstacle information in the work scene is determined according to the depth map and the second obstacle information in the work scene is determined according to the height map includes that a first obstacle contour in the depth map and coordinate information of the first obstacle contour are determined by using a contour search algorithm or a clustering algorithm; and a second obstacle contour in the height map and coordinate information of the second obstacle contour are determined by using the contour search algorithm or the clustering algorithm.

In a second aspect, an embodiment of the present disclosure provides an intelligent obstacle avoidance apparatus based on binocular vision. The apparatus includes an image acquisition module, an obstacle information determination module, an obstacle determination module and an obstacle avoidance control module.

The image acquisition module is configured to acquire, through a binocular camera, a depth map of a work scene in a moving direction of a robot and calculate a height map corresponding to the work scene according to the depth map.

The obstacle information determination module is configured to determine first obstacle information in the work scene according to the depth map and determine second obstacle information in the work scene according to the height map.

The obstacle determination module is configured to determine a target obstacle existing in the work scene and position information of the target obstacle according to the first obstacle information and the second obstacle information.

The obstacle avoidance control module is configured to control the robot to perform obstacle avoidance according to the position information and a preset path of the robot.

In a third aspect, an embodiment of the present disclosure provides a robot. The robot includes at least one processor and a memory.

The memory is configured to store at least one program.

The at least one program, when executed by the at least one processor, causes the at least one processor to implement the intelligent obstacle avoidance method based on binocular vision according to any embodiment of the present disclosure.

In a fourth aspect, an embodiment of the present disclosure provides a computer-readable storage medium storing computer programs. The computer programs, when executed by a processor, implement the intelligent obstacle avoidance method based on binocular vision according to any embodiment of the present disclosure.

The embodiment of the present disclosure provides an intelligent obstacle avoidance method based on binocular vision. First, the depth map of a work scene in a moving direction of a robot is acquired through a binocular camera, and the height map corresponding to the work scene is calculated according to the depth map. Then, the first obstacle information in the work scene is determined according to the depth map, and the second obstacle information in the work scene is determined according to the height map. The target obstacles actually existing in the work scene and position information thereof are determined according to the obtained first obstacle information and second obstacle information, and then the robot is controlled to perform the obstacle avoidance according to the position information of each target obstacle and the preset path of the robot. According to the intelligent obstacle avoidance method based on binocular vision provided by the embodiment of the present disclosure, the final target obstacle and the position information thereof are determined by combining the obstacle information identified by the depth map and the height map, avoiding the problem of environmental interference in a process in which only the depth map is used for recognition, thereby improving the accuracy of obstacle recognition of the robot when obstacles are in front of the robot during the moving process so that the robot can perform effective obstacle avoidance.

DETAILED DESCRIPTION

The present disclosure is further described hereinafter in detail in conjunction with drawings and embodiments. It is to be understood that the embodiments described herein are intended to explain the present disclosure and not to limit the present disclosure. Additionally, it is to be noted that for ease of description, only part, not all, of the structures related to the present disclosure is illustrated in the drawings.

Before exemplary embodiments are discussed in more detail, it is to be noted that some of the exemplary embodiments are described as processing or methods depicted in flowcharts. Although the flowcharts describe the steps as sequentially processed, many of the steps may be implemented concurrently, coincidently or simultaneously. Additionally, the sequence of the steps may be rearranged. The processing may be terminated when the operations are completed, but the processing may further have additional steps which are not included in the drawings. The processing may correspond to a method, a function, a procedure, a subroutine, a subprogram, and the like.

Embodiment One

Figure 1:
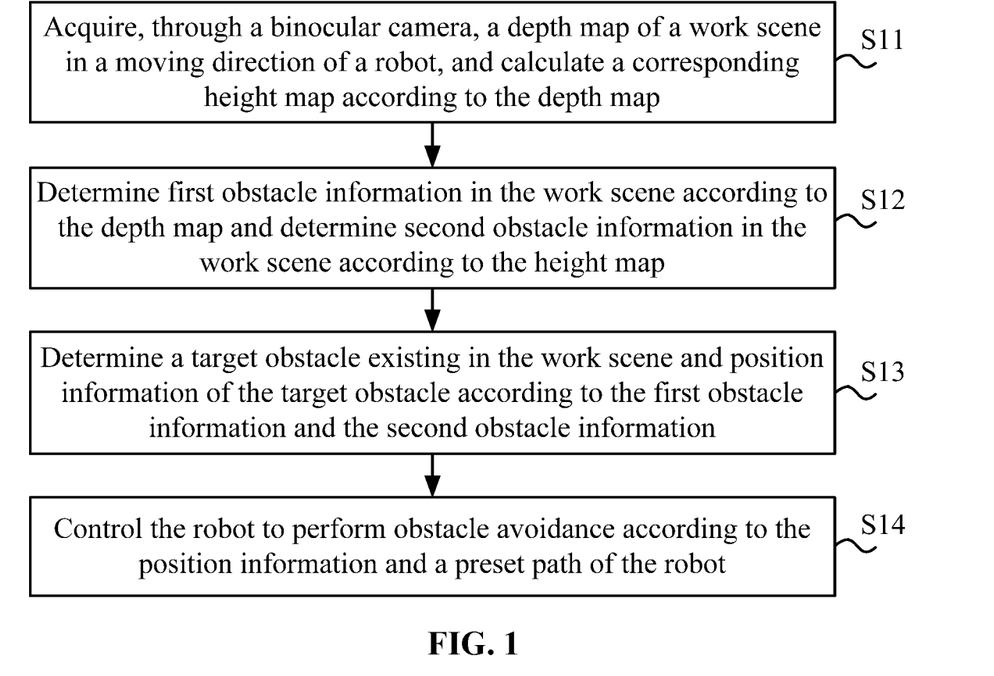
FIG. 1 is a flowchart of an intelligent obstacle avoidance method based on binocular vision according to embodiment one of the present disclosure.

FIG. 1 is a flowchart of an intelligent obstacle avoidance method based on binocular vision according to embodiment one of the present disclosure. This embodiment is applicable to the case where various robots avoid obstacles to prevent collision during the movement of the robots in the process of executing tasks. This method may be executed by an intelligent obstacle avoidance apparatus based on binocular vision provided by an embodiment of the present disclosure. This apparatus may be implemented in a manner of hardware and/or software and be generally integrated into various robots. As shown in FIG. 1, this method includes the steps below.

In S11, a depth map of a work scene in a moving direction of a robot is acquired through a binocular camera, and a corresponding height map is obtained according to the depth map.

A RealSense camera may be used as the binocular camera. The depth map may be directly obtained from the RealSense camera through a corresponding software interface. By using the binocular camera, a depth map with a higher resolution may be obtained, and a detected object is more three-dimensional so that the obstacle avoidance is more flexible and accurate. In an embodiment when a robot (such as a pusher robot and a mowing robot) is working, the work scene in the current moving direction may be captured in real time by the binocular camera. The captured image may be directly calculated by the binocular camera to obtain a corresponding depth map. Then, the depth map is transmitted to an obstacle avoidance processor to be an input of an obstacle detection algorithm. After the depth map is acquired, a height map corresponding to the work scene may be calculated according to the depth map, which is conducive to determining a final target obstacle by combining the depth map and the height map subsequently.

In an embodiment the step in which the corresponding height map is calculated according to the depth map include that the depth map is converted to point cloud data of the work scene, and the point cloud data is converted to the height map. In an embodiment, the process in which the depth map is converted to the point cloud data is the process in which an image coordinate system is converted to a world coordinate system. Similarly, the process in which the point cloud data is converted to the height map is the process in which the world coordinate system is converted back to the image coordinate system. The conversion process may be based on intrinsic parameters and extrinsic parameters of the binocular camera which may be read from the binocular camera. The specific conversion process may apply any existing conversion method, which is not limited in this embodiment.

In S12, first obstacle information in the work scene is determined according to the depth map, and second obstacle information in the work scene is determined according to the height map.

In an embodiment, after the depth map and the height map are obtained, the obstacle information in the depth map and the obstacle information in the height map may be extracted respectively, that is, the first obstacle information and the second obstacle information are obtained respectively. The specific extraction process may apply any existing contour extraction method. The extracted obstacle information may include contour coordinate information of the obstacle.

In an embodiment, the step in which the first obstacle information in the work scene is determined according to the depth map, and the second obstacle information in the work scene is determined according to the height map includes that a first obstacle contour in the depth map and the coordinate information of the first obstacle contour are determined by using a contour search algorithm or a clustering algorithm; and a second obstacle contour in the height map and the coordinate information of the second obstacle contour are determined by using the contour search algorithm or the clustering algorithm. In an embodiment, the contour in the image may be extracted by using the contour search algorithm or the clustering algorithm. The contour search algorithm is taken as an example for description. In an embodiment, the find contours function in the opencv may be used for first determining an initial starting point (such as the pixel point in the lower left corner of the image). Then, from the initial starting point, boundary points between foreground points and background points in the depth map are searched for according to a preset routing method. The obtained boundary points are sequentially connected to obtain the first obstacle contour. The coordinate information of the first obstacle contour may be determined according to the coordinates of the boundary points. The foreground points are the pixel points that belong to the obstacle. The background points are the pixel points that do not belong to the obstacle. The basis for determining whether a pixel point is a boundary point is that if the pixel value difference between two adjacent pixel points is greater than a preset threshold, the foreground point in the two pixel points may be used as a boundary point.

For the extraction of the second obstacle contour and the coordinate information of the second obstacle in the height map, reference may be made to the preceding process. However, due to different heights of obstacles, the height values of different parts of the same obstacle in the height map are quite different, and the range of change of the height value difference between the pixel points at different positions on the second obstacle contour and the background points adjacent to the pixel points is relatively large. In this case, if a fixed preset threshold is used analogously to the depth map, the determination result of the boundary point may be inaccurate. It can be seen that if the original height value of the height map is directly used, it is difficult to determine whether a point is a boundary point, and it is not convenient to perform comparison by directly setting a more appropriate threshold. Therefore, before the boundary points are searched for according to the preset routing method, the height map may be binarized first. In an embodiment, the pixel value of the pixel point whose height value is greater than a preset pixel value (such as 1) in the height map may be assigned a value of 1, and the pixel values of other pixel points may be assigned a value of 0. Therefore, when whether a point is a boundary point is determined, it is only necessary to determine whether pixel values adjacent to the point are 0 and 1. By binarizing the height map, foreground points and background points in the height map are directly distinguished and obtained, and the pixel value of each point is only 0 or 1. The boundary points in the height map can be obtained more accurately without further comparison by setting an additional preset threshold.

In S13, a target obstacle existing in the work scene and position information of the target obstacle are determined according to the first obstacle information and the second obstacle information.

In an embodiment, the depth map is configured to indicate the distance between the camera and the object, and the height map is configured to indicate the height of the object. Since the first obstacle information obtained through the depth map is interfered by environmental factors such as the ground, non-obstacles such as the ground are identified as obstacles. Since for the second obstacle information obtained through the height map, the distance information cannot be obtained, some distant obstacles that do not affect the operation of the robot are identified, causing the robot to stop at a distance. Therefore, it is usually inaccurate to use only the depth map or the height map to determine the obstacle existing in the work scene ahead. In this embodiment, some obstacles that are incorrectly identified can be eliminated by combining the obtained first obstacle information and the second obstacle information. Thus, the target obstacle that actually affects the operation of the robot can be screened out. In an embodiment, the obstacle that only exists in the first obstacle information or the second obstacle information may be screened out. The position information may include coordinate information and distance information. The coordinate information may be determined according to the coordinate positions of the determined target obstacle in the depth map or the height map. The distance information may be determined according to the depth value of each pixel point at the coordinate position where the determined target obstacle is in the depth map.

In an embodiment, the step in which the target obstacle existing in the work scene and position information of the target obstacle are determined according to the first obstacle information and the second obstacle information includes that a first initial obstacle existing in the depth map is determined according to the first obstacle information, and a second initial obstacle existing in the height map is determined according to the second obstacle information; an overlap region of the first initial obstacle and the second initial obstacle is identified, and an overlap ratio of the first initial obstacle and the second initial obstacle is calculated based on the overlap region; and the overlap ratio is compared with a preset overlap ratio threshold, and if the overlap ratio is greater than or equal to the preset overlap ratio threshold, the first initial obstacle or the second initial obstacle is correspondingly determined as the target obstacle. In an embodiment, the first initial obstacle may be determined according to a first obstacle contour in the obtained first obstacle information. The first initial obstacle is an object, such as a vehicle or a stone, existing in a robot work scene. The number of first initial obstacles may be one, two or more. It is to be noted that the closed contour independent from other closed contours in first obstacle contours is determined as the contour of one obstacle, and then each first initial obstacle is determined according to each contour. The determination method of the second initial obstacle is the same as that of the first initial obstacle, and details are not described herein. In an actual work scene, the first initial obstacle obtained by the depth map may be the same obstacle vehicle as the second initial obstacle obtained by the height map. Alternatively, the first initial obstacle obtained by the depth map is the ground, but there is no ground in the second initial obstacle obtained by the height map. It is known from common knowledge that only when the first initial obstacle and the second initial obstacle are the same obstacle, the overlap ratio of the overlap region between the two is maximum.

After the first initial obstacle and the second initial obstacle are determined, the overlap region of the first initial obstacle and the second initial obstacle may be obtained according to contour coordinates of the first initial obstacle and contour coordinates of the second initial obstacle. As described above, the number of the first initial obstacles may be one or more, the number of the second initial obstacles may be one or more, and then the obtained overlap region may also be one or more. When only one overlap region is obtained, the overlap ratio of the first initial obstacle and the second initial obstacle may be directly calculated by using the overlap region. In an embodiment, the overlap ratio may be calculated by dividing the overlap area of the overlap region by the contour area of the first initial obstacle, the contour area of the second initial obstacle or the contour union area of the first initial obstacle and the second initial obstacle. The overlap area may be calculated according to the contour coordinates of the overlap region obtained by the identification. For example, one pixel point may occupy one per unit area, and the overlap area may be determined according to the number of pixel points included in the contour coordinates of the overlap region. Of course, the overlap area may be calculated by other graphic area calculation formulas, and this is not limited by this embodiment. When multiple overlap regions are obtained, the area of each overlap region may be calculated separately. The contour coordinates of the first initial obstacle corresponding to each overlap region and the contour coordinates of the second initial obstacle corresponding to each overlap region are used for calculation separately. The specific calculation process is the same as above and not described herein again. After one or more overlap ratios are calculated, each overlap ratio may be compared with a preset overlap ratio threshold (such as 80%). If an overlap ratio is greater than or equal to the preset overlap rate threshold, the first initial obstacle or the second initial obstacle corresponding to the overlap ratio may be determined as the target obstacle. By identifying the overlap region, the obstacle appearing only in the depth map or the height map can be first filtered out. Further, by comparing the overlap ratio with the preset overlap ratio threshold, it is possible to determine that the obstacle recognized in the depth map and the obstacle recognized in the height map are the same obstacle with a larger probability. Thus, the obstacle recognition is more accurate so that the robot can avoid obstacles more accurately. In particular, the ground may be recognized as an obstacle in the depth map. In this case, when an obstacle actually exists in the ground region, the obstacle may be normally recognized in the height map. If the distance between the obstacle and the robot is relatively close, the obstacle avoidance needs to be performed. However, generally, the recognized area of the ground region is large, and the contour area of the obstacle recognized in the height map is not large; therefore, there may be a case where it is determined that the obstacle avoidance is not required because the calculated overlap ratio does not reach the preset overlap ratio threshold, and this is obviously inconsistent with the actual situation. Therefore, in the process of capturing by the binocular camera, the area of the ground region which may be recognized may be reduced by raising the angle of the camera. Thus, the calculated overlap ratio can fall within the range of the preset overlap ratio threshold, thereby implementing accurate recognition.

Further, in an embodiment, the step in which the overlap region of the first initial obstacle and the second initial obstacle is identified, and the overlap ratio of the first initial obstacle and the second initial obstacle is calculated based on the overlap region includes that a first minimum circumscribed rectangle of the first initial obstacle and a second minimum circumscribed rectangle of the second initial obstacle are extracted; the overlap region is identified according to the first minimum circumscribed rectangle and the second minimum circumscribed rectangle; and the overlap ratio is calculated according to first coordinates of the first minimum circumscribed rectangle and second coordinates of the second minimum circumscribed rectangle. In an embodiment, when the overlap ratio is calculated, a first minimum circumscribed rectangle of the contour of the first initial obstacle and a second minimum circumscribed rectangle of the contour of the second initial obstacle may be first calculated. Then, the overlap region between the first minimum circumscribed rectangle and the second minimum circumscribed rectangle may be used as the overlap region between the first initial obstacle corresponding to the first minimum circumscribed rectangle and the second initial obstacle the corresponding to second minimum circumscribed rectangle. The contour of the overlap region may be identified according to the first coordinates of the first minimum circumscribed rectangle and the second coordinates of the second minimum circumscribed rectangle, and then the area of the overlap region may be calculated. The overlap ratio is calculated by dividing the area by the area of the first minimum circumscribed rectangle, the area of the second minimum circumscribed rectangle, or the union area of the first minimum circumscribed rectangle and the second minimum circumscribed rectangle. It is to be noted that when there are multiple first initial obstacles and second initial obstacles, it is necessary to calculate the minimum circumscribed rectangles of the multiple obstacles, and further obtain multiple overlap ratios. In this embodiment, the minimum circumscribed rectangle is used for calculating the overlap ratio for subsequent determination, making the calculation process simpler, thereby improving the computer performance and saving computer resources.

Further, in an embodiment, the step in which the target obstacle existing in the work scene and the position information of the target obstacle are determined according to the first obstacle information and the second obstacle information further includes that the position information is determined according to the first coordinates and/or the second coordinates corresponding to the target obstacle. In an embodiment, after the target obstacles are determined by the preceding method, and the minimum circumscribed rectangles of the first initial obstacle and the second initial obstacle corresponding to each target obstacle are determined, the coordinate information in the position information of the corresponding target obstacle may be determined according to the coordinates of the minimum circumscribed rectangle of the selected initial obstacle, and the distance information in the position information of the target obstacle may be determined according to the depth value of each pixel point in the minimum circumscribed rectangle of the first initial obstacle corresponding to the target obstacle. For example, after comparison of the overlap area is completed, the corresponding first initial obstacle is determined as the target obstacle, and then the position information of the target obstacle may be determined according to the first coordinates of the first minimum circumscribed rectangle of the first initial obstacle. In an embodiment, the first coordinates may be directly used as the coordinate information of the target obstacle, and the average of the depth values of all pixel points in a first coordinate range may be calculated as the distance information of the target obstacle. For example, after comparison of the overlap area is completed, the corresponding second initial obstacle is determined as the target obstacle, and then the distance information of the target obstacle may be determined according to the first coordinates of the first minimum circumscribed rectangle of the first initial obstacle. In an embodiment, the average of the depth values of all pixel points in the first coordinate range may be calculated as the distance information of the target obstacle, and the coordinate information of the target obstacle is determined according to the second coordinates of the second minimum circumscribed rectangle of the second initial obstacle. In an embodiment, the second coordinates may be directly used as the coordinate information of the target obstacle. Preferably, the coordinates identified in the height map, that is, the second coordinates, are more accurate and more trustworthy. In addition, the coordinates of the overlap region between the first minimum circumscribed rectangle and the second minimum circumscribed rectangle may be determined according to the first coordinates and the second coordinates, and the coordinates of the overlap region are used as the coordinate information of the target obstacle. The first coordinates or the second coordinates are used for determining each piece of position information so that the position information of the recognized target obstacle is more regular and more suitable for the existing obstacle avoidance control mode. Thus, the robot can better determine the following traveling mode, further ensuring the effect of obstacle avoidance.

Further, in an embodiment, the method, after the first initial obstacles existing in the depth map are determined according to the first obstacle information, the method further includes the following step: the first initial obstacles are screened according to first contour areas of the first initial obstacles to remove a first initial obstacle whose first contour area is smaller than a first preset area threshold. Moreover, after the second initial obstacles existing in the height map are determined according to the second obstacle information, the method further includes the following step: the second initial obstacles are screened according to second contour areas of the second initial obstacles to remove a second initial obstacles whose second contour area is smaller than a second preset area threshold. The contour area is the area contained within the corresponding contour. In an embodiment, after the first initial obstacles and the second initial obstacles are determined, the smaller obstacles in the work scene may be eliminated first according to the contour area of each initial obstacle, that is, the obstacles may not affect the action of the robot. Thus, the obstacle avoidance is not required so that the amount of subsequent calculation is reduced. The first preset area threshold and the second preset area threshold may be set according to the size of objects which do not actually affect the movement of the robot, such as some weeds and small stones on the ground. In other word, it can be understood that obstacle whose area exceeds the first preset area threshold or the second preset area threshold needs to be avoided. The identified initial obstacles may first be screened by comparing with the first preset area threshold and the second preset area threshold. In an embodiment, among the first initial obstacles, the first initial obstacle whose first contour area is smaller than the first preset area threshold may be filtered out and among the second initial obstacles, the second initial obstacle whose second contour area is smaller than the second preset area threshold may be filtered out. The first preset area threshold and the second preset area threshold may be set to the same area value.

In S14, the robot is controlled to perform obstacle avoidance according to the position information and a preset path of the robot.

In an embodiment, after the position information of each target obstacle is determined, it may be determined whether each target obstacle affects the normal operation of the robot according to the position information and the preset path of the robot. If the robot is not affected, the normal operation can be continued. If the robot is affected, obstacle avoidance can be performed.

According to the technical scheme provided in the embodiment of the present disclosure, first, the depth map of the work scene in the moving direction of the robot is acquired through the binocular camera, the corresponding height map according to the depth map is calculated; the first obstacle information in the work scene is determined according to the depth map, and the second obstacle information in the work scene is determined according to the height map; target obstacles actually existing in the work scene and position information thereof are determined according to the obtained first obstacle information and second obstacle information; and the robot is controlled to perform obstacle avoidance according to the position information of each target obstacle and the preset path of the robot. The final target obstacle and the position information thereof are determined by combining the obstacle information identified by the depth map and the height map, avoiding the problem of environmental interference in a process in which only the depth map is used for recognition, thereby improving the accuracy of obstacle recognition of the robot when obstacles are in front of the robot during the moving process so that the robot can perform effective obstacle avoidance.

Embodiment Two

Figure 2:
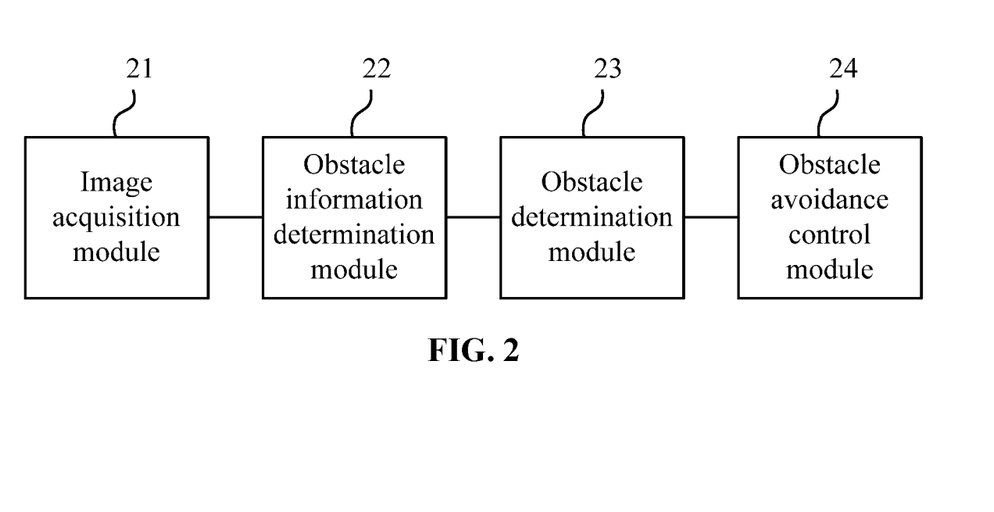
FIG. 2 is a diagram illustrating the structure of an intelligent obstacle avoidance apparatus based on binocular vision according to embodiment two of the present disclosure.

FIG. 2 is a diagram illustrating the structure of an intelligent obstacle avoidance apparatus based on binocular vision according to embodiment two of the present disclosure. The apparatus may be implemented in a manner of hardware and/or software, and be generally integrated into a robot to execute the intelligent obstacle avoidance method based on binocular vision according to any embodiment of the present disclosure. As shown in FIG. 2, the apparatus includes an image acquisition module 21, an obstacle information determination module 22, an obstacle determination module 23 and an obstacle avoidance control module 24.

The image acquisition module 21 is configured to acquire, through a binocular camera, a depth map of a work scene in a moving direction of a robot and obtain a corresponding height map according to the depth map.

The obstacle information determination module 22 is configured to determine first obstacle information in the work scene according to the depth map and determine second obstacle information in the work scene according to the height map.

The obstacle determination module 23 is configured to determine a target obstacle existing in the work scene and position information of the target obstacle according to the first obstacle information and the second obstacle information.

The obstacle avoidance control module 24 is configured to control the robot to perform obstacle avoidance according to the position information and a preset path of the robot.

According to the technical scheme provided in this embodiment of the present disclosure, first, the depth map of the work scene in the moving direction of the robot is acquired through the binocular camera, and the corresponding height map is calculated according to the depth map; the first obstacle information in the work scene is determined according to the depth map, and the second obstacle information in the work scene is determined according to the height map; the target obstacles actually existing in the work scene and position information thereof are determined according to the obtained first obstacle information and second obstacle information; and then the robot is controlled to perform obstacle avoidance according to the position information of each target obstacle and a preset path of the robot. The final target obstacle and the position information thereof are determined by combining the obstacle information identified by the depth map and the height map, avoiding the problem of environmental interference in a process in which the depth map is simply used for recognition, thereby improving the accuracy of obstacle recognition of the robot when obstacles are in front of the robot during the moving process so that the robot can perform effective obstacle avoidance.

On the basis of the preceding technical scheme, in an embodiment, the obstacle determination module 23 includes an initial obstacle determination unit, an overlap ratio determination unit and a target obstacle determination unit.

The initial obstacle determination unit is configured to determine a first initial obstacle existing in the depth map according to the first obstacle information and determine a second initial obstacle existing in the height map according to the second obstacle information.

The overlap ratio determination unit is configured to identify an overlap region of the first initial obstacle and the second initial obstacle and calculate an overlap ratio of the first initial obstacle and the second initial obstacle based on the overlap region.

The target obstacle determination unit is configured to compare the overlap ratio with a preset overlap ratio threshold, and if the overlap ratio is greater than or equal to the preset overlap ratio threshold, determine the first initial obstacle or the second initial obstacle correspondingly as the target obstacle.

On the basis of the preceding technical scheme, in an embodiment, the overlap ratio determination unit includes a minimum circumscribed rectangle determination subunit, an overlap region identification subunit and an overlap ratio calculation subunit.

The minimum circumscribed rectangle determination subunit is configured to extract a first minimum circumscribed rectangle of the first initial obstacle and a second minimum circumscribed rectangle of the second initial obstacle.

The overlap region identification subunit is configured to identify the overlap region according to the first minimum circumscribed rectangle and the second minimum circumscribed rectangle.

The overlap ratio calculation subunit is configured to calculate the overlap ratio according to first coordinates of the first minimum circumscribed rectangle and second coordinates of the second minimum circumscribed rectangle.

On the basis of the preceding technical scheme, in an embodiment, the obstacle determination module 23 further includes a position information determination unit.

The position information determination unit is configured to determine the position information according to the first coordinates and/or the second coordinates corresponding to the target obstacle.

On the basis of the preceding technical scheme, in an embodiment, the obstacle determination module 23 further includes a first screening unit and a second screening unit.

The first screening unit is configured to, after the first initial obstacle existing in the depth map is determined according to the first obstacle information, screen first initial obstacles according to first contour areas of the first initial obstacles to remove a first initial obstacle whose first contour area is smaller than a first preset area threshold.

The second screening unit is configured to, after the second initial obstacle existing in the depth map is determined according to the second obstacle information, screen second initial obstacles according to second contour areas of the second initial obstacles to remove a second initial obstacle whose second contour area is smaller than a second preset area threshold.

On the basis of the preceding technical scheme, in an embodiment, the image acquisition module 21 includes a point cloud data conversion unit and a height map conversion unit.

The point cloud data conversion unit is configured to convert the depth map to point cloud data of the work scene.

The height map conversion unit is configured to convert the point cloud data to the height map.

On the basis of the preceding technical scheme, in an embodiment, the obstacle information determination module 22 is configured to determine a first obstacle contour in the depth map and coordinate information of the first obstacle contour by using a contour search algorithm or a clustering algorithm; and determine a second obstacle contour in the height map and coordinate information of the second obstacle contour by using the contour search algorithm or the clustering algorithm.

The intelligent obstacle avoidance apparatus based on binocular vision provided in this embodiment of the present disclosure may execute the intelligent obstacle avoidance method based on binocular vision provided in any embodiment of the present disclosure, and has functional modules and beneficial effects corresponding to the execution method.

It is to be noted that units and modules included in the preceding embodiment of the intelligent obstacle avoidance apparatus based on binocular vision are just divided according to functional logic, and the division is not limited to this, as long as the corresponding functions can be implemented. In addition, the specific name of each functional unit is just intended for distinguishing, and is not to limit the scope of the present disclosure.

Embodiment Three

Figure 3:
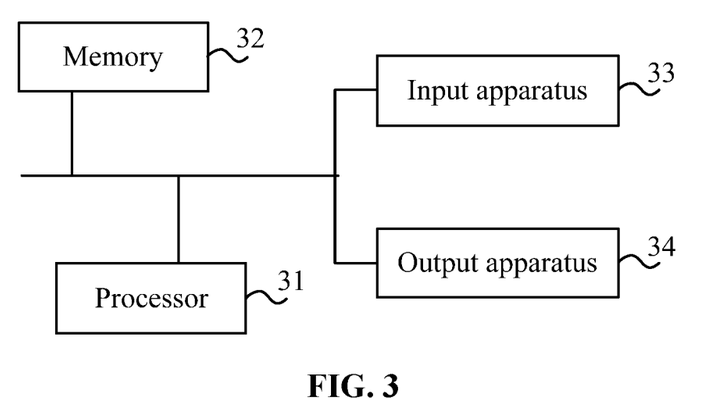
FIG. 3 is a diagram illustrating the structure of a robot according to embodiment three of the present disclosure.

FIG. 3 is a diagram illustrating the structure of a robot according to embodiment three of the present disclosure. FIG. 3 shows a block diagram of an exemplary robot applicable to implement embodiments of the present disclosure. The robot shown in FIG. 3 is merely an example and is not intended to limit the function and use scope of the embodiments of the present disclosure. As shown in FIG. 3, the robot includes a processor 31, a memory 32, an input apparatus 33 and an output apparatus 34. One or more processors 31 may be disposed in the robot, and one processor 31 is taken as an example in FIG. 3. The processor 31, the memory 32, the input apparatus 33 and the output apparatus 34 in the robot may be connected by a bus or other modes. Connecting by a bus is used as an example in FIG. 3.

The memory 32 serves as a computer-readable storage medium may be configured to store software programs, computer-executable programs and modules, such as program instructions/modules (for example, the image acquisition module 21, the obstacle information determination module 22, the obstacle determination module 23 and the obstacle avoidance control module 24 in the intelligent obstacle avoidance apparatus based on binocular vision) corresponding to the intelligent obstacle avoidance method based on binocular vision in the embodiments of the present disclosure. The processor 31 executes various function applications and data processing of the robot, that is, implements the preceding intelligent obstacle avoidance method based on binocular vision, by executing software programs, instructions and modules stored in the memory 32.

The memory 32 may mainly include a program storage region and a data storage region. The program storage region may store an operating system and at least one application required for functions. The data storage region may store data and the like created according to the use of the robot. Additionally, the memory 32 may include a high-speed random access memory and may also include a non-volatile memory, for example, at least one disk memory element, flash memory element or another non-volatile solid-state memory element. In some examples, the memory 32 may further include memories located remotely relative to the processor 31 and these remote memories may be connected to the robot via networks. Examples of the preceding network include, but are not limited to, the Internet, an intranet, a local area network, a mobile communication network and a combination thereof.

The input apparatus 33 may be configured to acquire images of the work scene in front of the robot and generate key signal input related to user settings and function control of the robot and the like. The output apparatus 34 may be configured to control the moving of the robot and the like.

Embodiment Four

Embodiment four of the present disclosure further provides a storage medium containing computer-executable instructions. When executed by a computer processor, the computer-executable instructions execute an intelligent obstacle avoidance method based on binocular vision. This method includes the steps below.

A depth map of a work scene in a moving direction of a robot is acquired through a binocular camera, and a corresponding height map is obtained according to the depth map.

First obstacle information in the work scene is determined according to the depth map, and second obstacle information in the work scene is determined according to the height map.

A target obstacle existing in the work scene and position information of the target obstacle are determined according to the first obstacle information and the second obstacle information.

The robot is controlled to perform obstacle avoidance according to the position information and a preset path of the robot.

In an embodiment, A non-transitory computer-readable storage medium storing computer programs is provided, where the programs, when executed by a processor, implement the intelligent obstacle avoidance method based on binocular vision in any one of the embodiments of the present application.

The storage medium may be any one of various types of memory devices or storage devices. The term "storage medium" is intended to include a mounting medium such as a compact disc read-only memory (CD-ROM), a floppy disk or a magnetic tape device; a computer system memory or a random access memory (RAM) such as a dynamic random access memory (DRAM), a double data rate (DDR) RAM, a static random access memory (SRAM), an extended data output (EDO) RAM or a Rambus RAM; a non-volatile memory such as a flash memory or a magnetic medium (such as a hard disk or an optical storage device); and a register or other similar types of memory elements. The storage medium may further include other types of memories or combinations thereof. In addition, the storage medium may be located in a computer system in which programs are executed, or may be located in a different second computer system connected to the computer system through a network (such as the Internet). The second computer system may provide program instructions to a computer for execution. The term "storage medium" may include two or more storage media which may reside at different positions (such as in different computer systems connected through a network). The storage medium may store program instructions (for example, embodied as computer programs) which are executable by one or more processors.

Of course, in the storage medium containing computer-executable instructions provided in embodiments of the present disclosure, the computer-executable instructions execute not only the preceding method operations but also related operations in the intelligent obstacle avoidance method based on binocular vision provided in any embodiment of the present disclosure.

The computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal or any suitable combination thereof. The computer-readable signal medium may further be any computer-readable medium other than the computer-readable storage medium. The computer-readable medium may send, propagate, or transmit a program used by or used in conjunction with an instruction execution system, apparatus or device.

Program codes contained in the computer-readable medium may be transmitted via any suitable medium. The medium includes, but is not limited to, the wireless, a wire, an optical cable, the radio frequency (RF) or the like, or any appropriate combination thereof.

From the preceding description of embodiments, it will be apparent to those skilled in the art that the present disclosure may be implemented by means of software and necessary general-purpose hardware or may of course be implemented by hardware, but in many cases the former is a preferred embodiment. Based on this understanding, the technical scheme provided in the present disclosure substantially, or the part contributing to the related art, may be embodied in the form of a software product. The software product is stored in a computer-readable storage medium, such as a computer floppy disk, a read-only memory (ROM), a random access memory (RAM), a flash, a hard disk or an optical disk, and includes several instructions for enabling a computer device (which may be a personal computer, a server or a network device) to perform the method according to each embodiment of the present disclosure.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. An intelligent obstacle avoidance method based on binocular vision, comprising:
   acquiring, through a binocular camera, a depth map of a work scene in a moving direction of a robot, and calculating a height map corresponding to the work scene according to the depth map;
   determining first obstacle information in the work scene according to the depth map, and determining second obstacle information in the work scene according to the height map;
   determining a target obstacle existing in the work scene and position information of the target obstacle according to the first obstacle information and the second obstacle information; and
   controlling the robot to perform obstacle avoidance according to the position information and a preset path of the robot;
   wherein determining the target obstacle existing in the work scene and the position information of the target obstacle according to the first obstacle information and the second obstacle information comprises:
   determining a first initial obstacle existing in the depth map according to the first obstacle information, and determining a second initial obstacle existing in the height map according to the second obstacle information;
   identifying an overlap region of the first initial obstacle and the second initial obstacle, and calculating an overlap ratio of the first initial obstacle and the second initial obstacle based on the overlap region.

2. The intelligent obstacle avoidance method based on binocular vision according to claim 1, wherein determining the target obstacle existing in the work scene and the position information of the target obstacle according to the first obstacle information and the second obstacle information further comprises:
   comparing the overlap ratio with a preset overlap ratio threshold, and in response to determining that the overlap ratio is greater than or equal to the preset overlap ratio threshold, determining one of the first initial obstacle or the second initial obstacle as the target obstacle.

3. The intelligent obstacle avoidance method based on binocular vision according to claim 2, wherein identifying the overlap region of the first initial obstacle and the second initial obstacle, and calculating the overlap ratio of the first initial obstacle and the second initial obstacle based on the overlap region comprises:
   extracting a first minimum circumscribed rectangle of the first initial obstacle and a second minimum circumscribed rectangle of the second initial obstacle;
   identifying the overlap region according to the first minimum circumscribed rectangle and the second minimum circumscribed rectangle; and
   calculating the overlap ratio according to first coordinates of the first minimum circumscribed rectangle and second coordinates of the second minimum circumscribed rectangle; wherein determining the target obstacle existing in the work scene and the position information of the target obstacle according to the first obstacle information and the second obstacle information further comprises: determining the position information according to the first coordinates and/or the second coordinates corresponding to the target obstacle.

4. The intelligent obstacle avoidance method based on binocular vision according to claim 2, after determining the first initial obstacle existing in the depth map according to the first obstacle information, further comprising:
   screening first initial obstacles according to first contour areas of the first initial obstacles to remove a first initial obstacle whose first contour area is smaller than a first preset area threshold; and
   after determining the second initial obstacle existing in the height map according to the second obstacle information, further comprising:
   screening second initial obstacles according to second contour areas of the second initial obstacles to remove a second initial obstacle whose second contour area is smaller than a second preset area threshold.

5. The intelligent obstacle avoidance method based on binocular vision according to claim 1, wherein calculating the height map corresponding to the work scene according to the depth map comprises:
   converting the depth map to point cloud data of the work scene; and
   converting the point cloud data to the height map.

6. The intelligent obstacle avoidance method based on binocular vision according to claim 1, wherein determining the first obstacle information in the work scene according to the depth map, and determining the second obstacle information in the work scene according to the height map comprises:

determining a first obstacle contour in the depth map and coordinate information of the first obstacle contour by using a contour search algorithm or a clustering algorithm; and determining a second obstacle contour in the height map and coordinate information of the second obstacle contour by using the contour search algorithm or the clustering algorithm.

7. An intelligent obstacle avoidance apparatus based on binocular vision, comprising: at least one processor; and a memory configured to store at least one program, wherein the at least one program, when executed by the at least one processor, cause the at least one processor to implement:

an image acquisition module, which is configured to acquire, through a binocular camera, a depth map of a work scene in a moving direction of a robot, and calculate a height map corresponding to the work scene according to the depth map;

an obstacle information determination module, which is configured to determine first obstacle information in the work scene according to the depth map and determine second obstacle information in the work scene according to the height map;

an obstacle determination module, which is configured to determine a target obstacle existing in the work scene and position information of the target obstacle according to the first obstacle information and the second obstacle information; and an obstacle avoidance control module, which is configured to control the robot to perform obstacle avoidance according to the position information and a preset path of the robot;

wherein the obstacle information determination module comprises:

an initial obstacle determination unit, which is configured to determine a first initial obstacle existing in the depth map according to the first obstacle information, and determine a second initial obstacle existing in the height map according to the second obstacle information; and an overlap ratio determination unit, which is configured to identify an overlap region of the first initial obstacle and the second initial obstacle, and calculate an overlap ratio of the first initial obstacle and the second initial obstacle based on the overlap region.

8. The intelligent obstacle avoidance apparatus based on binocular vision according to claim 7, wherein the obstacle information determination module further comprises:

a target obstacle determination unit is configured to compare the overlap ratio with a preset overlap ratio threshold, and in response to determining that the overlap ratio is greater than or equal to the preset overlap ratio threshold, determine one of the first initial obstacle or the second initial obstacle as the target obstacle.

9. The intelligent obstacle avoidance apparatus based on binocular vision according to claim 8, wherein the overlap ratio determination unit comprises:

a minimum circumscribed rectangle determination subunit, which is configured to extract a first minimum circumscribed rectangle of the first initial obstacle and a second minimum circumscribed rectangle of the second initial obstacle;

an overlap region identification subunit, which is configured to identify the overlap region according to the first minimum circumscribed rectangle and the second minimum circumscribed rectangle; and an overlap ratio calculation subunit, which is configured to calculate the overlap ratio according to first coordinates of the first minimum circumscribed rectangle and second coordinates of the second minimum circumscribed rectangle; and wherein the obstacle determination module further comprises: a position information determination unit, which is configured to determine the position information according to the first coordinates and/or the second coordinates corresponding to the target obstacle.

10. The intelligent obstacle avoidance apparatus based on binocular vision according to claim 8, further comprising:

a first screening unit, which is configured to, after the first initial obstacle existing in the depth map is determined according to the first obstacle information, screen first initial obstacles according to first contour areas of the first initial obstacles to remove a first initial obstacle whose first contour area is smaller than a first preset area threshold; and a second screening unit, which is configured to, after the second initial obstacle existing in the height map is determined according to the second obstacle information, screen second initial obstacles according to second contour areas of the second initial obstacles to remove a second initial obstacle whose second contour area is smaller than a second preset area threshold.

11. The intelligent obstacle avoidance apparatus based on binocular vision according to claim 7, wherein the image acquisition module comprises:

a point cloud data conversion unit, which is configured to convert the depth map to point cloud data of the work scene; and a height map conversion unit, which is configured to convert the point cloud data to the height map.

12. The intelligent obstacle avoidance apparatus based on binocular vision according to claim 7, wherein the obstacle information determination module is configured to:

determine a first obstacle contour in the depth map and coordinate information of the first obstacle contour by using a contour search algorithm or a clustering algorithm; and determine a second obstacle contour in the height map and coordinate information of the second obstacle contour by using the contour search algorithm or the clustering algorithm.

13. A non-transitory computer-readable storage medium storing computer programs, wherein the programs, when executed by a processor, implement:

acquiring, through a binocular camera, a depth map of a work scene in a moving direction of a robot, and calculating a height map corresponding to the work scene according to the depth map;

determining first obstacle information in the work scene according to the depth map, and determining second obstacle information in the work scene according to the height map;

determining a target obstacle existing in the work scene and position information of the target obstacle according to the first obstacle information and the second obstacle information; and controlling the robot to perform obstacle avoidance according to the position information and a preset path of the robot;

wherein the programs, when executed by a processor, implement determining the target obstacle existing in the work scene and the position information of the target obstacle according to the first obstacle information and the second obstacle information in the following way:

determining a first initial obstacle existing in the depth map according to the first obstacle information, and determining a second initial obstacle existing in the height map according to the second obstacle information; and identifying an overlap region of the first initial obstacle and the second initial obstacle, and calculating an overlap ratio of the first initial obstacle and the second initial obstacle based on the overlap region.

14. The non-transitory computer-readable storage medium according to claim 13, wherein the programs, when executed by a processor, implement determining the target obstacle existing in the work scene and the position information of the target obstacle according to the first obstacle information and the second obstacle information in the following way:

comparing the overlap ratio with a preset overlap ratio threshold, and in response to determining that the overlap ratio is greater than or equal to the preset overlap ratio threshold, determining one of the first initial obstacle or the second initial obstacle as the target obstacle.

15. The non-transitory computer-readable storage medium according to claim 14, wherein the programs, when executed by a processor, implement identifying the overlap region of the first initial obstacle and the second initial obstacle, and calculating the overlap ratio of the first initial obstacle and the second initial obstacle based on the overlap region in the following way:

extracting a first minimum circumscribed rectangle of the first initial obstacle and a second minimum circumscribed rectangle of the second initial obstacle;

identifying the overlap region according to the first minimum circumscribed rectangle and the second minimum circumscribed rectangle; and calculating the overlap ratio according to first coordinates of the first minimum circumscribed rectangle and second coordinates of the second minimum circumscribed rectangle; and wherein the programs, when executed by a processor, implement determining the target obstacle existing in the work scene and the position information of the target obstacle according to the first obstacle information and the second obstacle information further in the following way: determining the position information according to the first coordinates and/or the second coordinates corresponding to the target obstacle.

16. The non-transitory computer-readable storage medium according to claim 14, wherein the programs, when executed by a processor, after implementing determining the first initial obstacle existing in the depth map according to the first obstacle information, further implement:

screening first initial obstacles according to first contour areas of the first initial obstacles to remove a first initial obstacle whose first contour area is smaller than a first preset area threshold; and wherein the programs, when executed by a processor, after implementing determining the second initial obstacle existing in the height map according to the second obstacle information, further implement:

screening second initial obstacles according to second contour areas of the second initial obstacles to remove a second initial obstacle whose second contour area is smaller than a second preset area threshold.

17. The non-transitory computer-readable storage medium according to claim 13, wherein the programs, when executed by a processor, implement calculating the height map corresponding to the work scene according to the depth map in the following way:

converting the depth map to point cloud data of the work scene; and converting the point cloud data to the height map.

18. The non-transitory computer-readable storage medium according to claim 13, wherein the programs, when executed by a processor, implement determining the first obstacle information in the work scene according to the depth map, and determining the second obstacle information in the work scene according to the height map in the following way:

determining a first obstacle contour in the depth map and coordinate information of the first obstacle contour by using a contour search algorithm or a clustering algorithm; and determining a second obstacle contour in the height map and coordinate information of the second obstacle contour by using the contour search algorithm or the clustering algorithm.

* * * * *